United States Patent
Orihashi et al.

(10) Patent No.: US 8,443,927 B2
(45) Date of Patent: May 21, 2013

(54) EXHAUST DEVICE OF VEHICLE AND STRADDLE-TYPE FOUR-WHEELED VEHICLE PROVIDED WITH THE SAME

(75) Inventors: Yoshihiko Orihashi, Akashi (JP); Masashi Fukuuchi, Kobe (JP); Atsushi Eto, Kakogawa (JP); Tamotsu Hatada, Awaji (JP); Ryosuke Masuike, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 266 days.

(21) Appl. No.: 12/979,653

(22) Filed: Dec. 28, 2010

(65) Prior Publication Data

US 2012/0160591 A1 Jun. 28, 2012

(51) Int. Cl.
*B60K 13/04* (2006.01)

(52) U.S. Cl.
USPC .......................................... 180/296; 180/309

(58) Field of Classification Search
USPC 180/309, 68.1, 68.2, 68.3, 219, 296; 181/228
See application file for complete search history.

(56) References Cited

U.S. PATENT DOCUMENTS

| 5,966,933 | A | * | 10/1999 | Ishihara et al. | 60/322 |
| 6,193,004 | B1 | * | 2/2001 | Cooksey et al. | 180/219 |
| 6,719,084 | B2 | | 4/2004 | Kuji et al. | |
| 2002/0096385 | A1 | * | 7/2002 | Kuji et al. | 180/309 |
| 2006/0219452 | A1 | * | 10/2006 | Okada et al. | 180/68.5 |

FOREIGN PATENT DOCUMENTS

| JP | 57070731 A | * | 5/1982 |
| JP | 58214416 A | * | 12/1983 |

* cited by examiner

*Primary Examiner* — Paul N Dickson
*Assistant Examiner* — Bridget Avery
(74) *Attorney, Agent, or Firm* — Wenderoth, Lind & Ponack, LLP

(57) ABSTRACT

An exhaust device of a vehicle having a V-engine including a front cylinder and a rear cylinder, includes at least one muffler disposed in a rear part of the vehicle, a front-cylinder exhaust pipe which is connected to a front surface of the front cylinder and which reaches the muffler, and a rear-cylinder exhaust pipe which is connected to a rear surface of the rear cylinder and which reaches the muffler. The front-cylinder exhaust pipe is curved rearward at a curved portion from a connecting portion between the front-cylinder exhaust pipe and the front cylinder inward of the side frame in the lateral direction. The front-cylinder exhaust pipe is located outward in the lateral direction with a fixed space from the engine, and extends toward a rear part of the vehicle substantially along the side frame as viewed from above.

6 Claims, 17 Drawing Sheets

EXHAUST DEVICE OF VEHICLE AND STRADDLE-TYPE FOUR-WHEELED VEHICLE PROVIDED WITH THE SAME

BACKGROUND OF THE INVENTION

1. Field of the Invention

The present invention relates to an exhaust device of a vehicle in which a V-engine having a front cylinder and a rear cylinder is installed, and to a straddle-type four-wheeled vehicle provided with the exhaust device.

2. Description of the Related Art

Conventionally, in a straddle-type four-wheeled vehicle in which the V-engine having the front cylinder and the rear cylinder is installed, as shown in FIG. 4 of U.S. Pat. No. 6,719,084, a front-cylinder exhaust pipe connected to a front surface of the front cylinder and reaching a muffler is disposed such that the front-cylinder exhaust pipe protrudes outward in a lateral direction of a side frame from a connecting portion between the front-cylinder exhaust pipe and a front cylinder, and extends rearward of the vehicle.

SUMMARY OF THE INVENTION

However, if the front-cylinder exhaust pipe is disposed as described above, there is a tendency that a temperature of a cowl located outward of the side frame is largely increased by a radiant heat from a part protruding outward in the lateral direction of the side frame of the front-cylinder exhaust pipe. Therefore, it is an object of the present invention to provide an exhaust device having a front-cylinder exhaust pipe capable of reducing a heat influence on a cowl located outward in the lateral direction of the side frame.

According to a first aspect of the present invention, there is provided an exhaust device of a vehicle having a V-engine including a front cylinder and a rear cylinder, including: at least one muffler disposed in a rear part of the vehicle, a front-cylinder exhaust pipe which is connected to a front surface of the front cylinder and which reaches the muffler, and a rear-cylinder exhaust pipe which is connected to a rear surface of the rear cylinder and which reaches the muffler, wherein the front-cylinder exhaust pipe is curved rearward at a curved portion from a connecting portion between the front-cylinder exhaust pipe and the front cylinder inward of a side frame in a lateral direction, the front-cylinder exhaust pipe is located outward in the lateral direction with a fixed space from the engine, and the front-cylinder exhaust pipe extends toward a rear part of the vehicle substantially along the side frame as viewed from above.

According to the above configuration, since the curved portion of the front-cylinder exhaust pipe is located inward in the lateral direction of the side frame, the heat influence of the front-cylinder exhaust pipe exerted on the cowl located outward in the lateral direction of the side frame can be reduced as compared with the conventional case where the curved portion of the front-cylinder exhaust pipe is located outward in the lateral direction of the side frame.

It is preferable that the first aspect of the present invention further has the following configurations.

(1) The curved portion is located rearward with a fixed space from a power steering motor.

(2) The front-cylinder exhaust pipe is located outward in the lateral direction with a fixed space from a throttle body of the engine.

(3) The rear-cylinder exhaust pipe is disposed inward in the lateral direction with respect to the front-cylinder exhaust pipe, behind the engine.

(4) The rear-cylinder exhaust pipe is disposed below the front-cylinder exhaust pipe, behind the engine.

(5) The front-cylinder exhaust pipe and the rear-cylinder exhaust pipe are connected to the same muffler, and an insertion length of the front-cylinder exhaust pipe into the muffler is shorter than an insertion length of the rear-cylinder exhaust pipe into the muffler so that an entire length of the front-cylinder exhaust pipe and an entire length of the rear-cylinder exhaust pipe becomes substantially equal to each other.

(6) In the configuration (5), a connecting portion of the front-cylinder exhaust pipe to the muffler and a connecting portion of the rear-cylinder exhaust pipe to the muffler are arranged side by side in a vertical direction.

According to the configuration (1), since the curved portion is disposed with a fixed distance so as to be away from the power steering motor, the heat influence of the front-cylinder exhaust pipe exerted on the motor can be reduced.

According to the configuration (2), since the front-cylinder exhaust pipe is disposed with a fixed distance so as to be away from the throttle body of the engine, the heat influence of the front-cylinder exhaust pipe exerted on the throttle body can be reduced.

According to the configuration (3), behind the engine, since the temperature of the rear-cylinder exhaust pipe is higher than that of the front-cylinder exhaust pipe, the heat influence from the rear-cylinder exhaust pipe exerted on the cowl located outward in the lateral direction can be blocked by the front-cylinder exhaust pipe by locating the rear-cylinder exhaust pipe inward in the lateral direction with respect to the front-cylinder exhaust pipe.

According to the configuration (4), behind the engine, since the temperature of the rear-cylinder exhaust pipe is higher than that of the front-cylinder exhaust pipe, the heat influence from the rear-cylinder exhaust pipe exerted on the vehicle body located above can be blocked by the front-cylinder exhaust pipe by locating the rear-cylinder exhaust pipe below the front-cylinder exhaust pipe.

According to the configuration (5), since the front-cylinder exhaust pipe and the rear-cylinder exhaust pipe are connected to the same muffler, it is possible to reduce the number of mufflers and to reduce the number of parts. The piping structure is simplified as compared with the piping structure utilizing a collecting tube, and the assembling operability can further be enhanced. By making an insertion length of the front-cylinder exhaust pipe into the muffler shorter than an insertion length of the rear-cylinder exhaust pipe into the muffler, the entire length of the front-cylinder exhaust pipe and the entire length of the rear-cylinder exhaust pipe become substantially equal to each other. Therefore, exhaust interference between the front-cylinder exhaust pipe and the rear-cylinder exhaust pipe can be reduced, and the output of the engine can be enhanced.

According to the configuration (6), since the front-cylinder exhaust pipe and the rear-cylinder exhaust pipe are arranged side by side in the vertical direction in front of the muffler, the front-cylinder exhaust pipe and the rear-cylinder exhaust pipe do not protrude in the lateral direction, and the front-cylinder exhaust pipe and the rear-cylinder exhaust pipe can be disposed compactly.

According to a second aspect of the present invention, there is provided a straddle-type four-wheeled vehicle having the exhaust device of the first aspect of the present invention.

According to the above configuration, it is possible to provide a straddle-type four-wheeled vehicle in which the heat influence on the cowl located outward in the lateral direction of the side frame is reduced.

In summary, according to the present invention, it is possible to reduce the heat influence on the cowl located outward in the lateral direction of the side frame.

DETAILED DESCRIPTION OF THE INVENTION

FIGS. 1 to 23 show a straddle-type all-terrain four-wheeled vehicle (ATV) and an exhaust device according to an embodiment of the present invention, and the present embodiment will be described based on these drawings. In the following description, conception of directions of the present embodiment matches with conception of directions as viewed from a driver of the straddle-type all-terrain four-wheeled vehicle.

Figure 1:
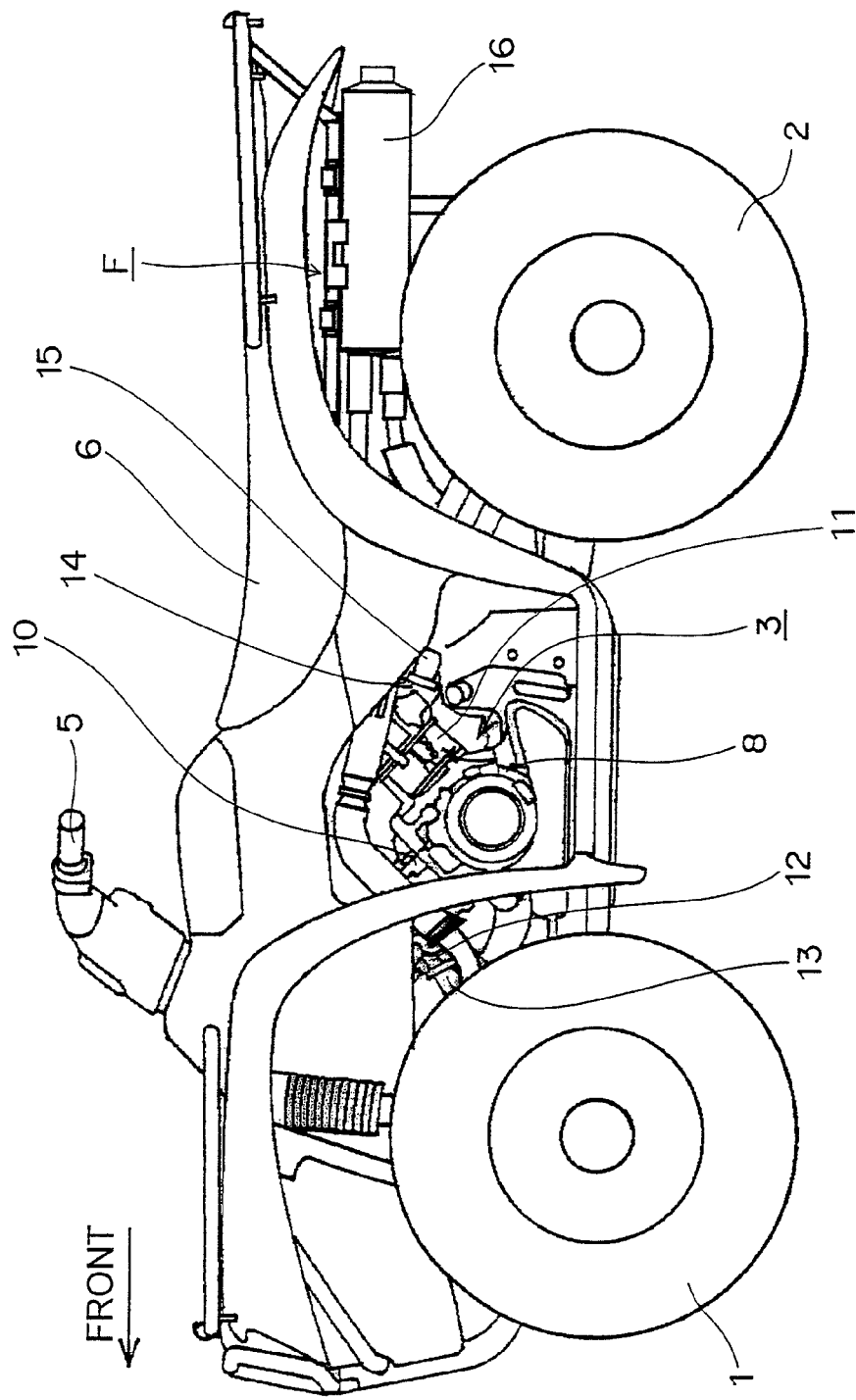
FIG. 1 is a left side view of a straddle-type all-terrain four-wheeled vehicle according to an embodiment of the present invention.

FIG. 1 is a left side view of the straddle-type all-terrain four-wheeled vehicle according to the embodiment of the present invention. A pair of left and right front wheels 1 and a pair of left and right rear wheels 2 are provided in a front part and a rear part of a body frame F, a two-cylinder V-engine 3 is installed between the front and rear wheels 1 and 2. A steering handle 5 is provided on a front part of an upper portion of the body frame F, and a straddle-type seat 6 is provided behind the steering handle 5. The two-cylinder V-engine 3 is provided with a front cylinder 10 tilted forward and a rear cylinder 11 tilted rearward on the upper side of a crankcase 8. An exhaust port 12 is formed in a front wall of the front cylinder 10, a front-cylinder exhaust pipe 13 is connected to the exhaust port 12, an exhaust port 14 is formed in a rear wall of the rear cylinder 11, and a rear-cylinder exhaust pipe 15 is connected to the exhaust port 14. A single muffler 16 that is common for the front and rear cylinders is disposed on a rear part of the body frame F, and the muffler 16 is located between the body frame F and the left rear wheel 2.

Figure 2:
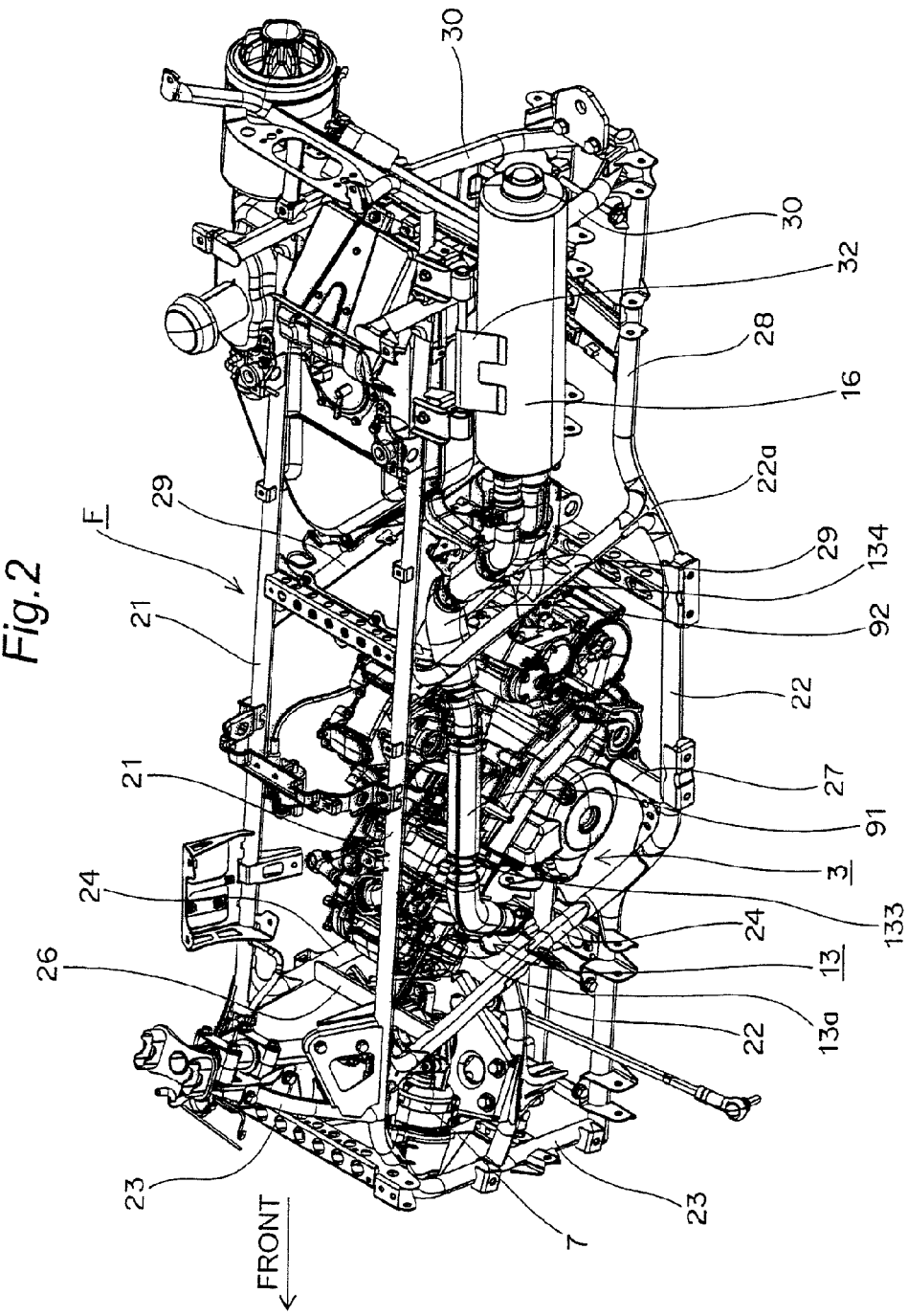
FIG. 2 is a perspective view of a body frame, an engine and an exhaust device of the vehicle shown in FIG. 1.

FIG. 2 is a perspective view of the body frame F, the engine 3 and the exhaust device. The following members are integrally formed together by welding: i.e., a pair of left and right upper part pipes 21 extending in a longitudinal direction, a pair of left and right lower part pipes 22 extending in the longitudinal direction, first front part pipes 23 which couple front ends of the upper part pipes 21 and the lower part pipes 22 to each other, second front part pipes 24 which are disposed behind the first front part pipes 23 with a fixed distance therefrom and which couple the upper part pipes 21 and the lower part pipes 22 to each other, and a plurality of cross pipes 26 and 27 which couple the left and right upper part pipes 21 and the left and right lower part pipes 22 to each other. A rising pipe 29 extending forward and upward is integrally formed on a rear end of each of the lower part pipes 22, and an upper end of the rising pipe 29 is coupled to the upper part pipe 21 by welding. A rear part support pipe 28 extending rearward is fixed to a rear end of each of the lower part pipes by welding, a rear end of the rear part support pipe 28 is coupled to lower ends of a pair of left and right rear part pipes 30 extending in the vertical direction, and the upper part of the rear part pipe 30 is coupled to a rear part of the upper part pipe 21.

The engine 3 is installed within a range surrounded by the upper part pipes 21 and the lower part pipes 22, and the muffler 16 is mounted on the rear part of the left upper part pipe 21 through a muffler mounting device 32.

Figure 3:
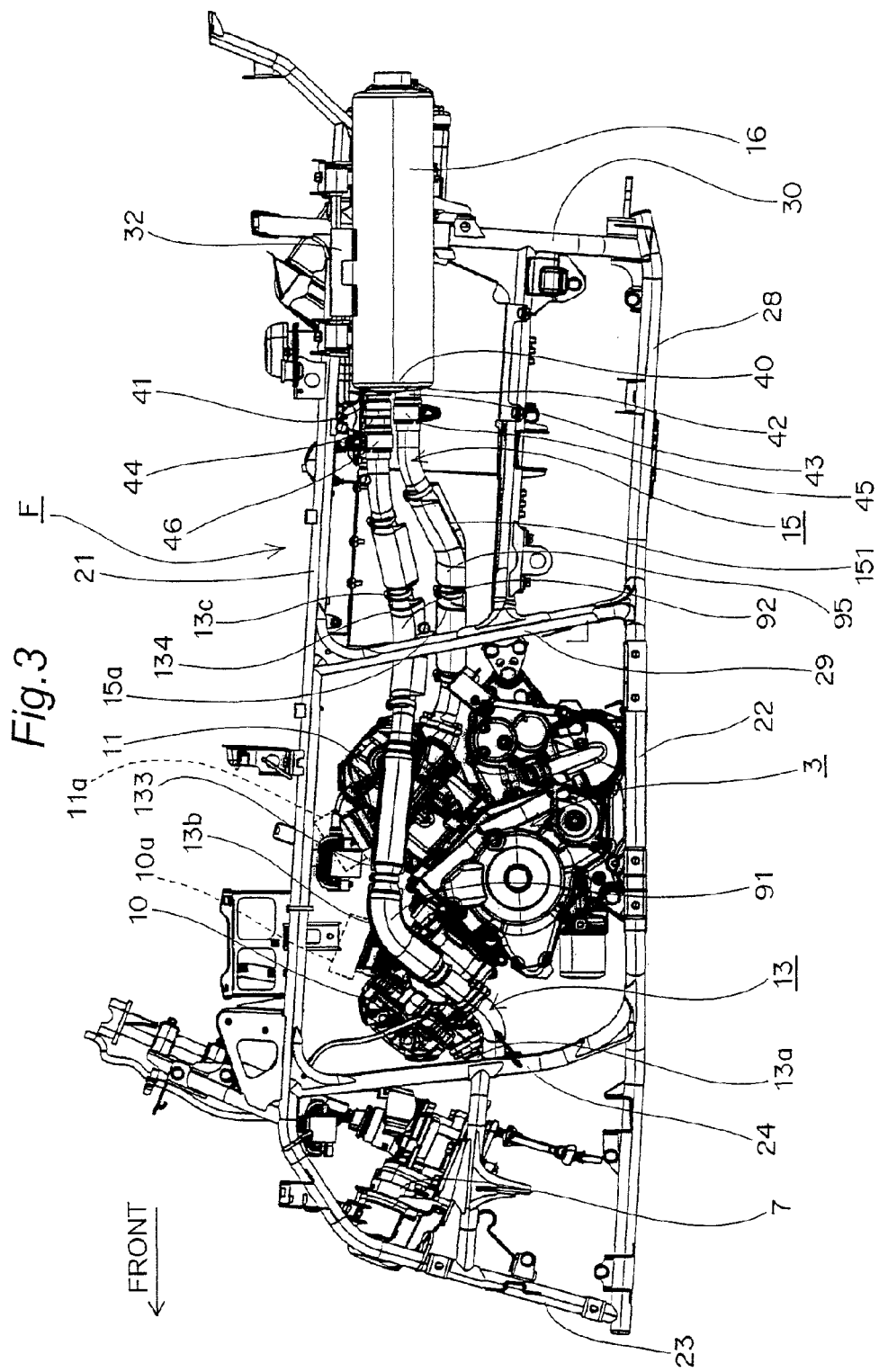
FIG. 3 is a left side view of the body frame, the engine and the exhaust device shown in FIG. 2.

FIG. 3 is a left side view of the body frame F, the engine 3 and the exhaust device shown in FIG. 2. A front-cylinder exhaust pipe connection port 41 and a rear-cylinder exhaust pipe connection port 42 are formed side by side in the vertical direction on a front wall 40 of the muffler 16. A joint tube 43 protruding forward is integrally welded to the rear-cylinder exhaust pipe connection port 42 on the lower side, a rear end of the rear-cylinder exhaust pipe 15 is detachably inserted into the joint tube 43, and fastened by a fastening band 45. A joint tube 44 protruding forward is integrally welded to the front-cylinder exhaust pipe connection port 41 on the upper side, and a rear end of the front-cylinder exhaust pipe 13 is detachably inserted into the joint tube 44, and fastened by a fastening band 46.

Figure 4:
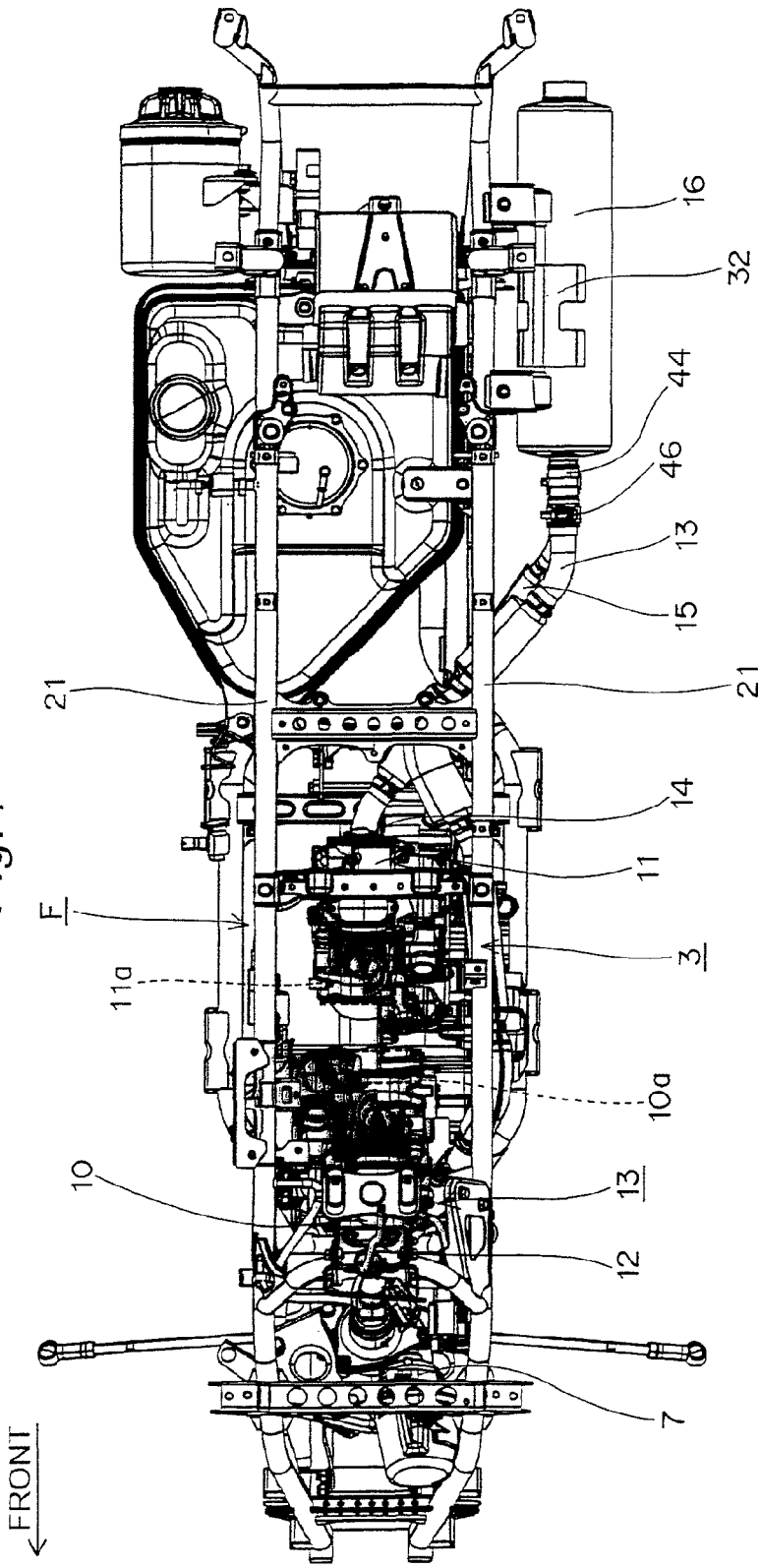
FIG. 4 is a plan view of the body frame, the engine and the exhaust device shown in FIG. 2.

FIG. 4 is a plan view of the body frame F, the engine 3 and the exhaust device shown in FIG. 2. As shown in FIGS. 2 and 4, the rear-cylinder exhaust pipe 15 extends diagonally leftward and rearward from the exhaust port 14 opening in the rear wall of the rear cylinder 11, the rear-cylinder exhaust pipe 15 protrudes leftward from the body frame F at a rear position of the left rising pipe 29, extends rearward on the left side of the left upper part pipe 21 and the left rear part support pipe 28 and reaches the muffler 16.

The front-cylinder exhaust pipe 13 extends leftward in a curved shape in the curved portion 13a from the exhaust port 12 which opens in the front wall of the front cylinder 10, and the front-cylinder exhaust pipe 13 is folded back rearward in a right direction (inward in the lateral direction) of the left second front part pipe 24 as shown in FIG. 2. An electric power steering motor 7 which assists a steering force of the steering handle 5 is provided in a lower portion of a shaft (not shown) of the steering handle 5. The curved portion 13a is located rearward with a fixed space from the motor 7. As shown in FIGS. 3 and 4, the front-cylinder exhaust pipe 13 extends rearward substantially along the left upper part pipe 21 as viewed from above while keeping a fixed space in the lateral direction from a left surface of the front cylinder 10, a left surface of the rear cylinder 11 and throttle bodies 10a and 11a of the engine 3. More specifically, the front-cylinder exhaust pipe 13 is disposed such that, in an outer side of the engine 3 in the lateral direction, an inner end of the front-cylinder exhaust pipe 13 in the lateral direction is located inward in the lateral direction as compared with an outer end of the upper part pipe 21 in the lateral direction. The front-cylinder exhaust pipe 13 is superposed on the rear-cylinder exhaust pipe 15 in the vertical direction above the rear-cylinder exhaust pipe 15 at a rear position of the left rising pipe 29 and a front position of the left rear part support pipe 28. Thereafter, the front-cylinder exhaust pipe 13 extends rearward on the left side of the left upper part pipe 21 and the left rear part support pipe 28, and reaches the muffler 16 which is the muffler 16 that the rear-cylinder exhaust pipe 15 reaches. As shown in FIG. 4, the front-cylinder exhaust pipe 13 is located outward (leftward) in the lateral direction with respect to the rear-cylinder exhaust pipe 15 behind the engine 3. As shown in FIGS. 3 and 4, a connecting portion of the front-cylinder exhaust pipe 13 to the muffler 16 and a connecting portion of the rear-cylinder exhaust pipe 15 to the muffler 16 are arranged side by side in the vertical direction.

Figure 5:
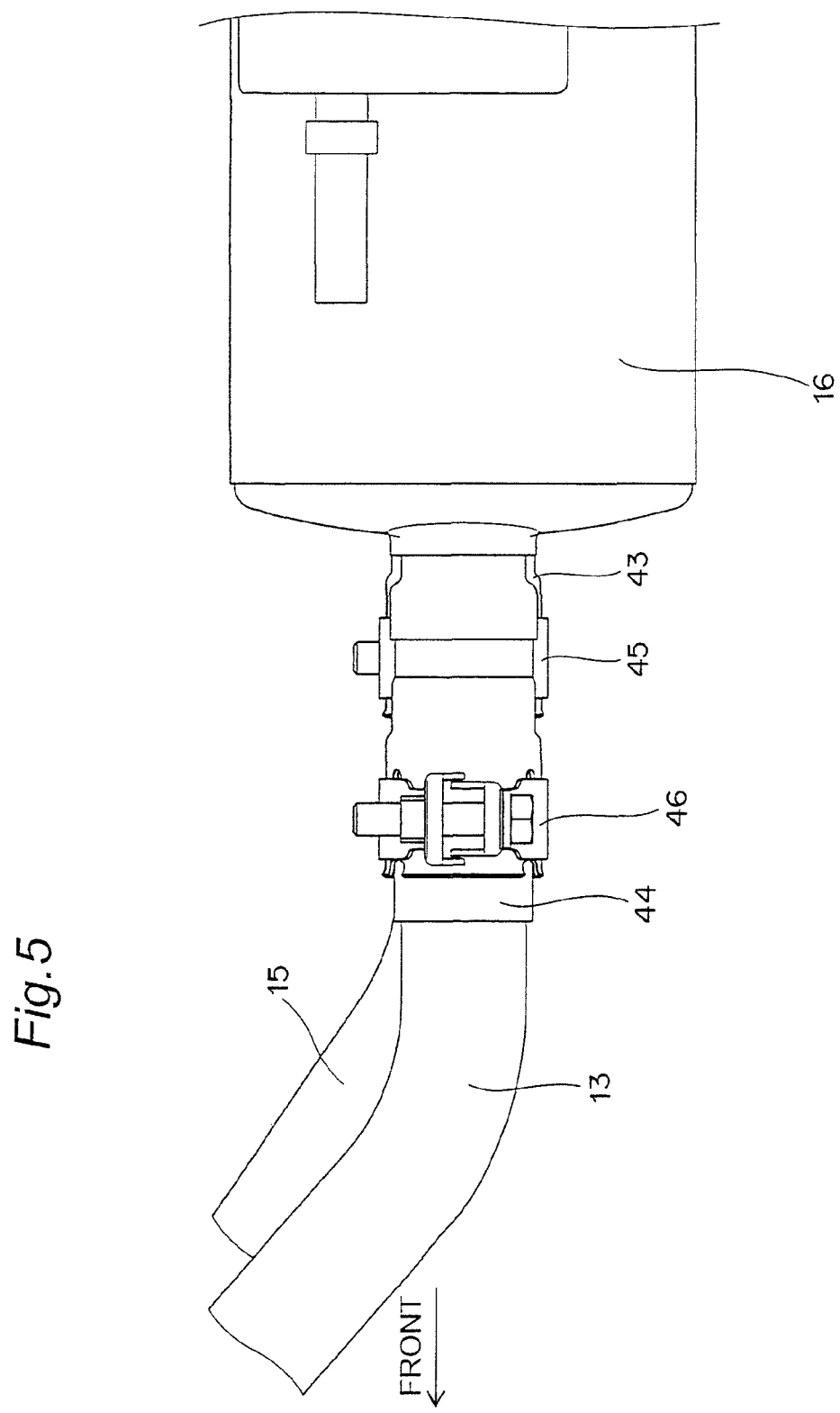
FIG. 5 is a plan view of a portion connecting a front-cylinder exhaust pipe and a rear-cylinder exhaust pipe to a muffler.
Figure 6:
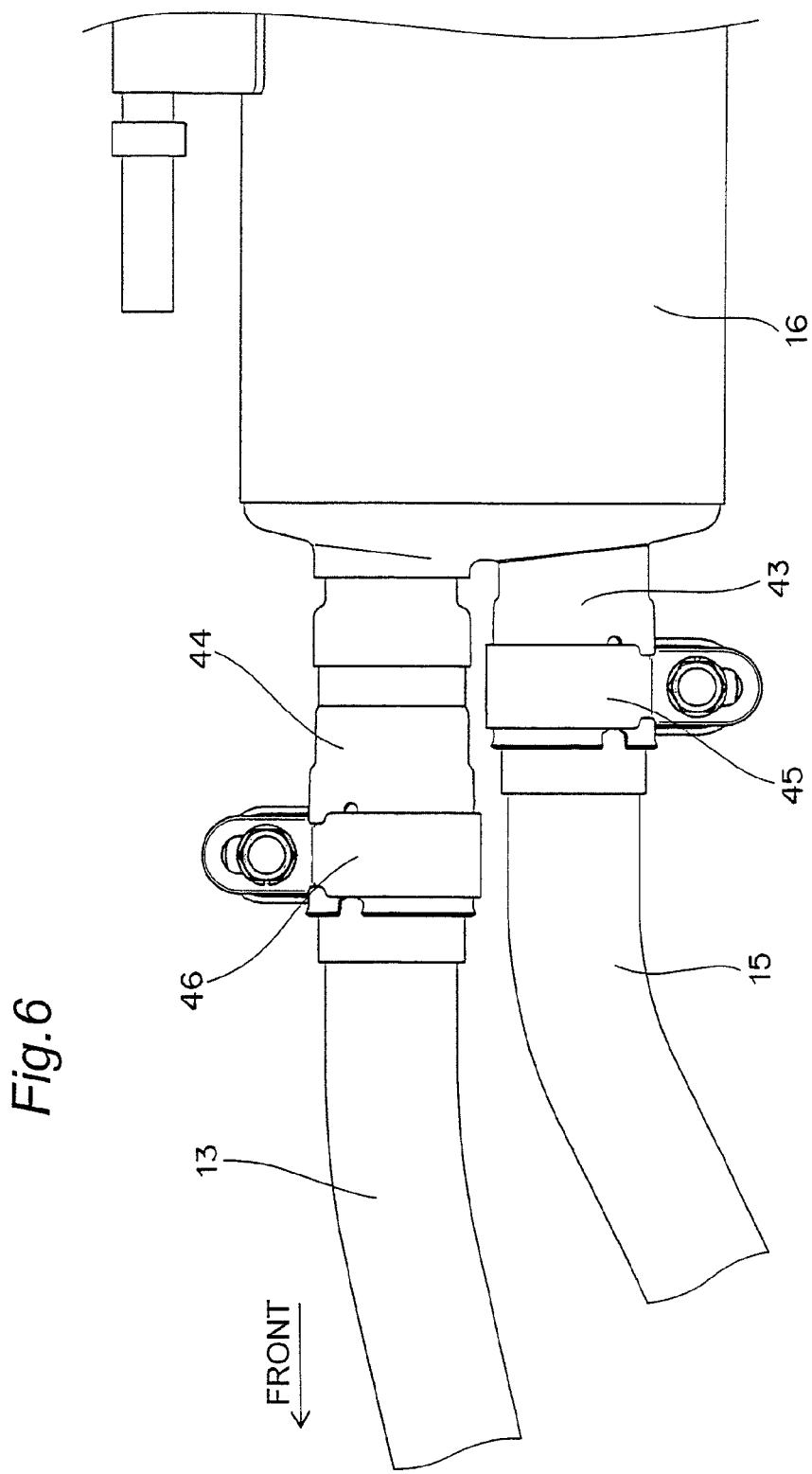
FIG. 6 is a side view of FIG. 5.

FIG. 5 is a plan view of a portion which connects the front-cylinder exhaust pipe 13 and the rear-cylinder exhaust pipe 15 to the muffler 16, and FIG. 6 is a side view thereof. As shown in FIGS. 5 and 6, the connecting portion of the front-cylinder exhaust pipe 13 to the muffler 16 and the connecting portion of the rear-cylinder exhaust pipe 15 to the muffler 16 are arranged side by side in the vertical direction. Since the front-cylinder exhaust pipe 13 and the rear-cylinder exhaust pipe 15 are arranged side by side in the vertical direction in front of the muffler 16, it is necessary to deviate, from each other, a longitudinal position of the fastening band 46 where the front-cylinder exhaust pipe 13 is fastened to the joint tube 44 and a longitudinal position of the fastening band 45 where the rear-cylinder exhaust pipe 15 is fastened to the joint tube 43. In the present embodiment, by locating the fastening band 46 in front of the fastening band 45, both the longitudinal positions are deviated from each other, a curvature of the front-cylinder exhaust pipe 13 in front of the fastening band 46 is made larger than a curvature of the rear-cylinder exhaust pipe 15 in front of the fastening band 45. According to this configuration, the front-cylinder exhaust pipe 13 is located outward (leftward) in the lateral direction with respect to the rear-cylinder exhaust pipe 15 behind the engine 3.

[Shape of Exhaust Pipe]

Figure 7:
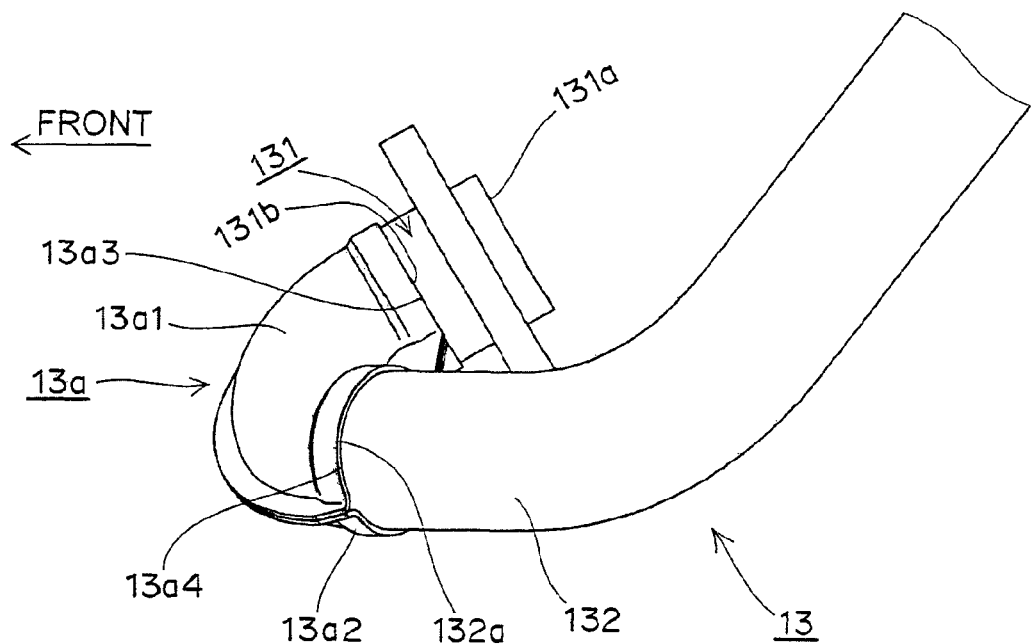
FIG. 7 is a partial enlarged view of a curved portion of the front-cylinder exhaust pipe.

FIG. 7 is a partial enlarged view of the curved portion 13a of the front-cylinder exhaust pipe 13. The curved portion 13a includes a pair of upper and lower half members 13a1 and 13a2. The front-cylinder exhaust pipe 13 is divided into a front end portion 131 and a front part 132. The exhaust upstream end 131a of the front end portion 131 is connected to the exhaust port 12 shown in FIG. 4, and the exhaust downstream end 131b of the front end portion 131 is inserted into a first opening 13a3 of the curved portion 13a. The exhaust upstream end 132a of the front part 132 is inserted into a second opening 13a4 of the curved portion 13a.

Figure 8:
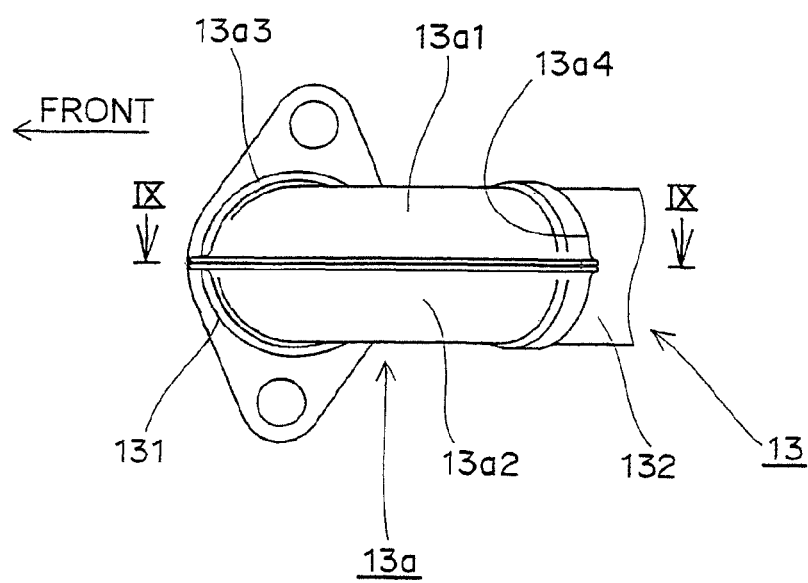
FIG. 8 is a front view of the curved portion shown in FIG. 7.

FIG. 8 is a front view of the curved portion 13a shown in FIG. 7. The half members 13a1 and 13a2 are bonded to each other by welding in the vertical direction, and by the welding and bonding of the half members 13a1 and 13a2, the front end portion 131 is fixed to the first opening 13a3 by welding, and the front part 132 is fixed to the second opening 13a4 by welding.

Figure 9:
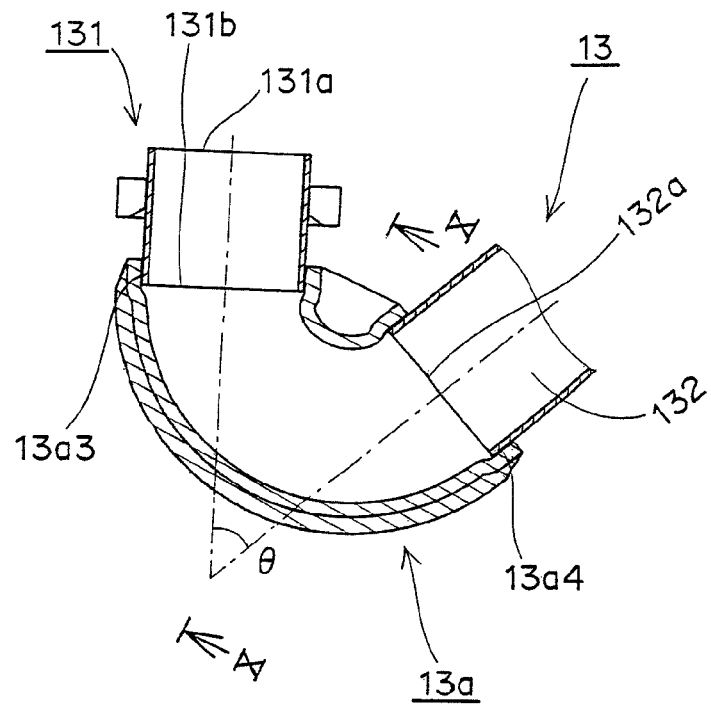
FIG. 9 is a sectional view taken along line IX-IX in FIG. 8.
Figure 10:
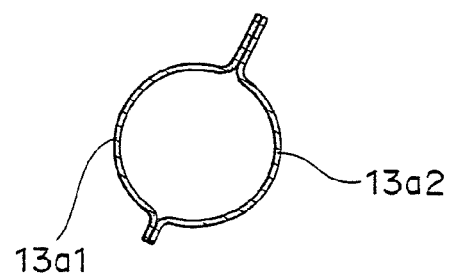
FIG. 10 is a sectional view taken along line X-X in FIG. 9.

FIG. 9 is a sectional view taken along line IX-IX in FIG. 8. FIG. 10 is a sectional view taken along line X-X in FIG. 9. As shown in FIGS. 9 and 10, the upper and lower half members 13a1 and 13a2 have the same shapes. An angle θ formed between a center line of the first opening 13a3 and a center line of the second opening 13a4 is about 45°, and by inserting the front end portion 131 into the first opening 13a3 and inserting the front part 132 into the second opening 13a4, the front-cylinder exhaust pipe 13 can extend in a curved shape leftward at the curved portion 13a and can be folded back rearward. By setting the angle θ formed between the first opening 13a3 and the second opening 13a4 to about 45°, the front-cylinder exhaust pipe 13 can be folded back rearward in the right direction (inward in the lateral direction) of the left second front part pipe 24.

After the front-cylinder exhaust pipe 13 is folded back rearward in the right direction of the second front part pipe 24 as shown in FIG. 3, the front-cylinder exhaust pipe 13 extends diagonally upward, passes through a portion near a left surface of the front cylinder 10 in a rearward and upward tilted attitude, the front-cylinder exhaust pipe 13 is bent slightly rearward and downward at a central portion of a V-bank between both the cylinders 10 and 11, and passes through a portion near the left surface of the rear cylinder 11.

As shown in FIGS. 2 and 3, the front-cylinder exhaust pipe 13 includes a first exhaust pipe cover 91 covering the entire periphery of an exhaust pipe front portion 133 located near the outer side of the engine 3 in the lateral direction, and a second exhaust pipe cover 92 covering an outer side of an exhaust pipe rear portion 134 in the lateral direction located behind the engine 3.

[Front-Cylinder Exhaust Pipe Cover]

Figure 11:
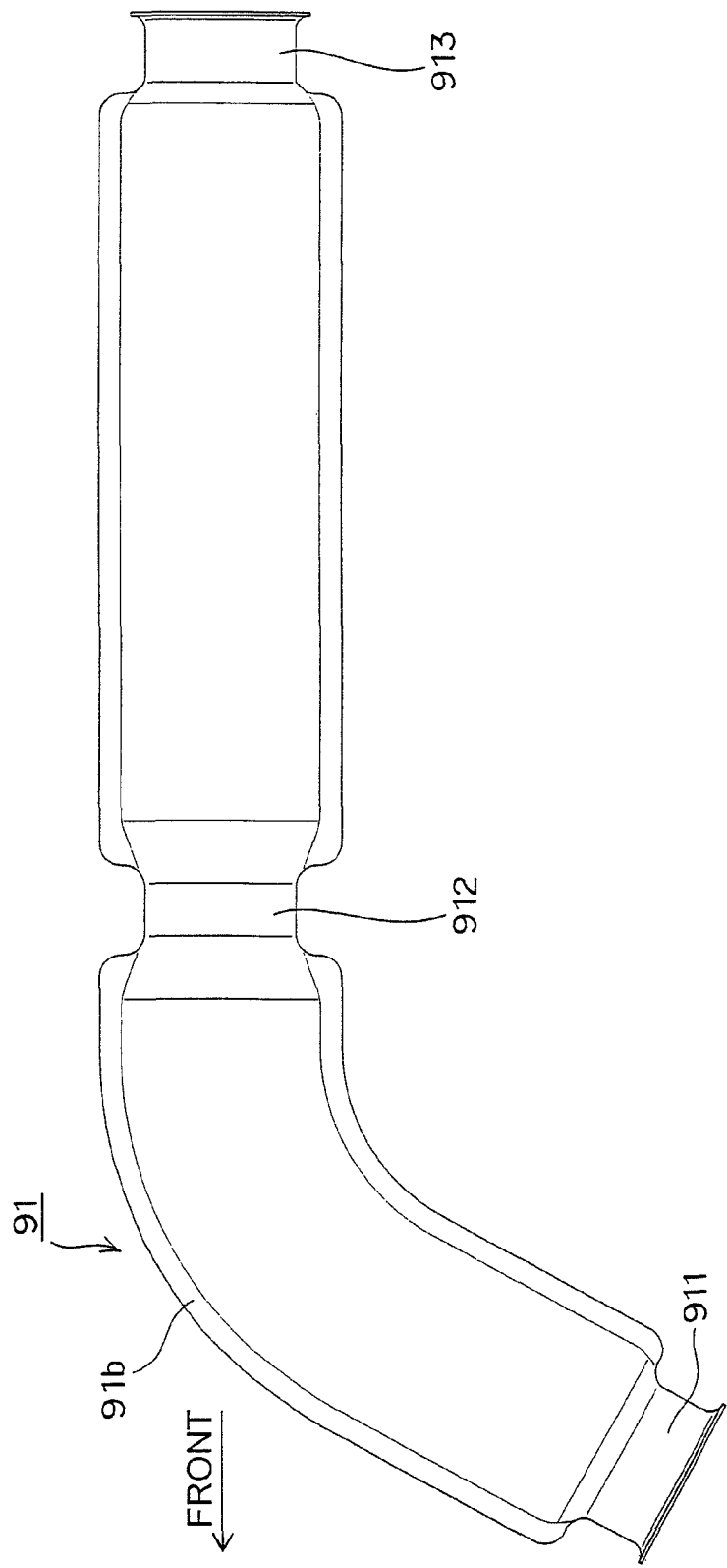
FIG. 11 is a side view of a first exhaust pipe cover.

FIG. 11 is a side view of the first exhaust pipe cover 91. As shown in FIG. 3, the exhaust pipe front portion 133 extends rearward and upward on a left surface of the front cylinder 10, and extends rearward substantially horizontally between the front cylinder 10 and the rear cylinder 11. Therefore, the exhaust pipe front portion 133 includes a bent part 13b at one location between the front cylinder 10 and the rear cylinder 11. Thus, the first exhaust pipe cover 91 includes a bent part 91b at a portion corresponding to the bent part 13b.

Figure 12:
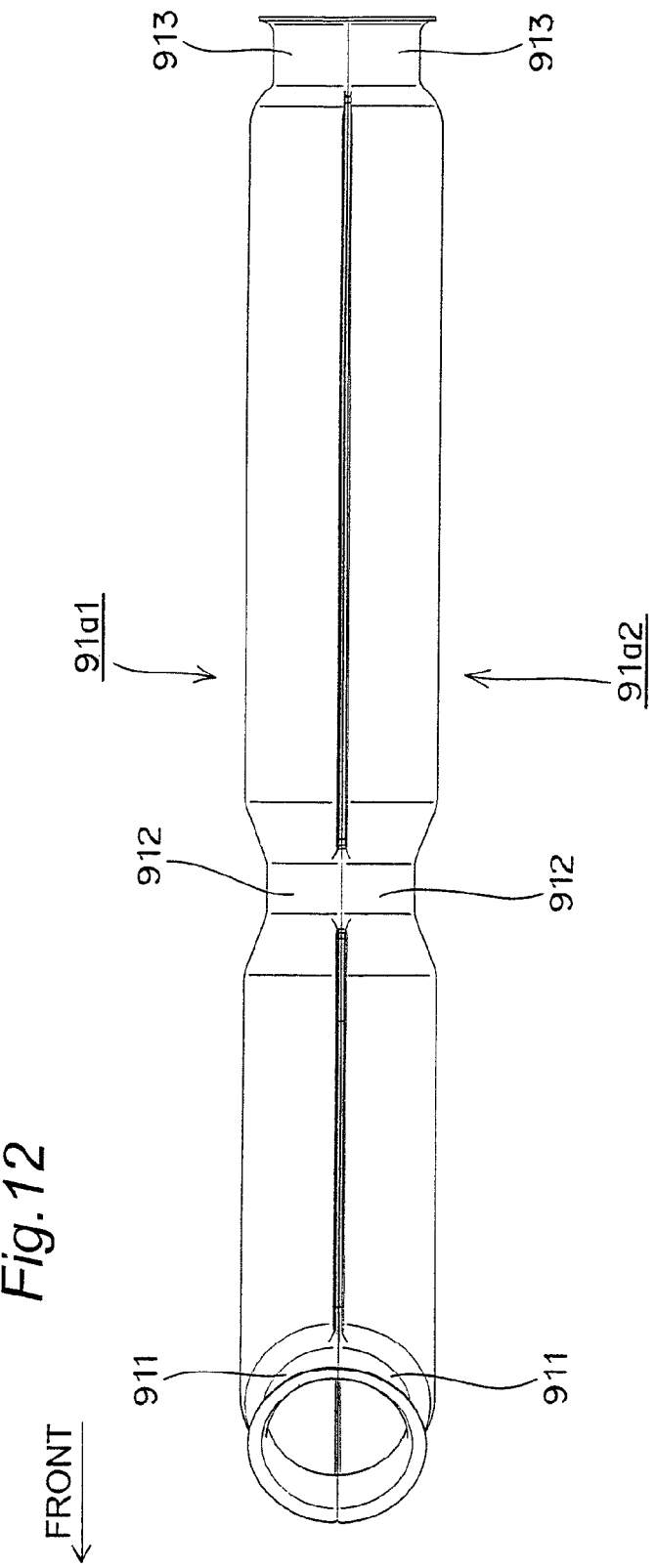
FIG. 12 is a plan view of FIG. 11, and shows one of half members.

FIG. 12 is a plan view of FIG. 11. As shown in FIG. 12, the first exhaust pipe cover 91 includes a pair of left and right half members 91a1 and 91a2.

Figure 13:
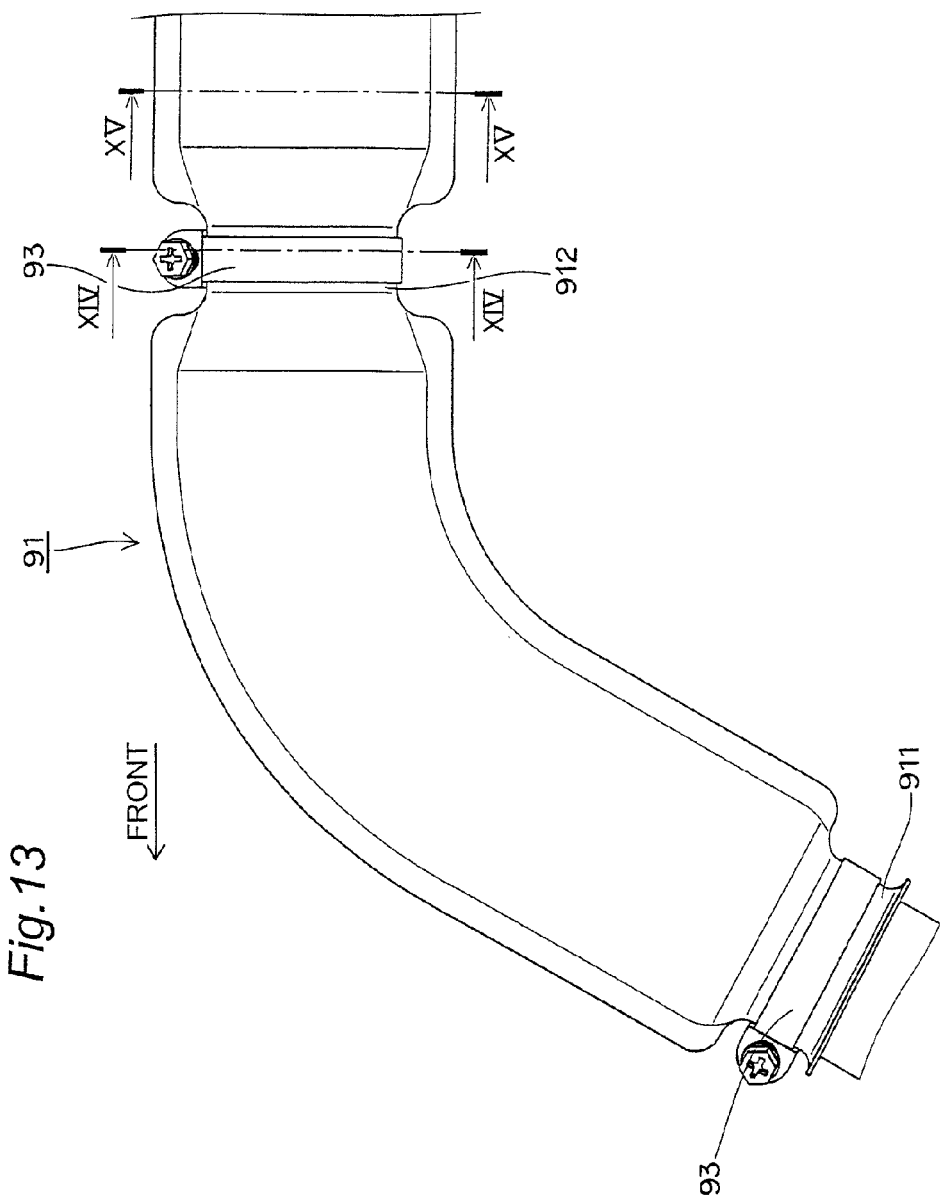
FIG. 13 is a diagram showing a state where the first exhaust pipe cover is mounted on a front portion of an exhaust pipe of the front-cylinder exhaust pipe.
Figure 14:
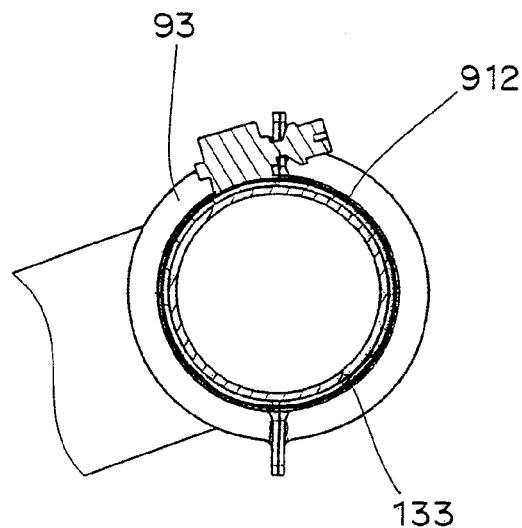
FIG. 14 is a sectional view taken along line XIV-XIV in FIG. 13.
Figure 15:
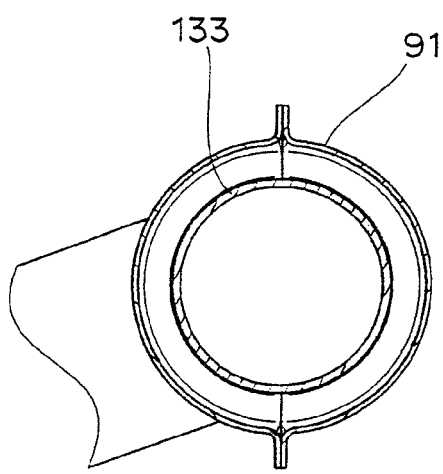
FIG. 15 is a sectional view taken along line XV-XV in FIG. 13.

The first exhaust pipe cover 91 includes narrow parts 911, 912 and 913 at three locations, i.e., a front part, an intermediate part and a rear part in the longitudinal direction of the vehicle. An inner diameter of each of the narrow parts is reduced. FIG. 13 shows a state where the first exhaust pipe cover 91 is mounted on the exhaust pipe front portion 133 of the front-cylinder exhaust pipe 13. FIG. 14 is a sectional view taken along line XIV-XIV in FIG. 13. FIG. 15 is a sectional view taken along line XV-XV in FIG. 13. The first exhaust pipe cover 91 is fastened by a clamp member 93 which is a support member at the narrow parts 911, 912 and 913, and the first exhaust pipe cover 91 comes into contact with an outer peripheral surface of the exhaust pipe front portion 133 and is fixed. Therefore, as shown in FIG. 14, the outer peripheral surface of the exhaust pipe front portion 133 and an inner peripheral surface of the first exhaust pipe cover 91 come into contact with each other at the narrow parts 911, 912 and 913, but a gap is formed between the outer peripheral surface of the exhaust pipe front portion 133 and the inner peripheral surface of the first exhaust pipe cover 91 at locations other than the narrow parts 911, 912 and 913 as shown in FIG. 15.

Figure 16:
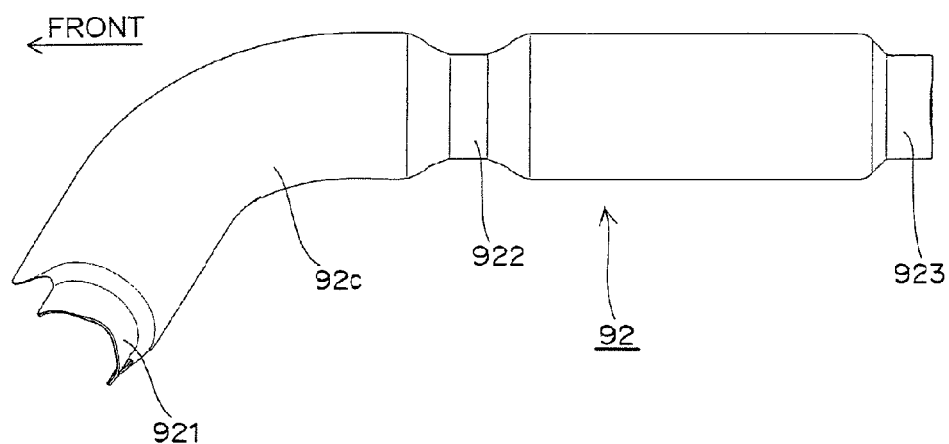
FIG. 16 is a side view of a second exhaust pipe cover.

FIG. 16 is a side view of the second exhaust pipe cover 92. As shown in FIG. 3, the exhaust pipe rear portion 134 extends rearward from a left rear portion of the rear cylinder 11, and has a bent part 13c at one location in the lateral direction. Therefore, the second exhaust pipe cover 92 includes a bent part 92c at a portion corresponding to the bent part 13c.

Figure 17:
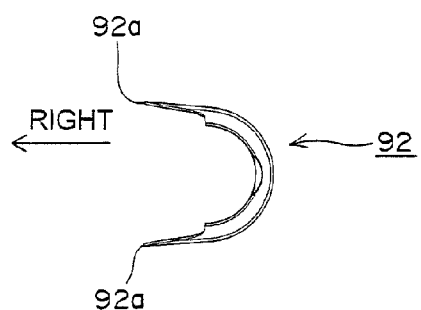
FIG. 17 is a front view of the second exhaust pipe cover shown in FIG. 16.

FIG. 17 is a front view of the second exhaust pipe cover 92 shown in FIG. 16. As shown in FIG. 17, the second exhaust pipe cover 92 has a substantially U-shaped cross section, and its opening-side end 92a is directed inward in the lateral direction. That is, the second exhaust pipe cover 92 covers an outer side (left side) of the exhaust pipe rear portion 134 shown in FIG. 3 in the lateral direction.

Figure 18:
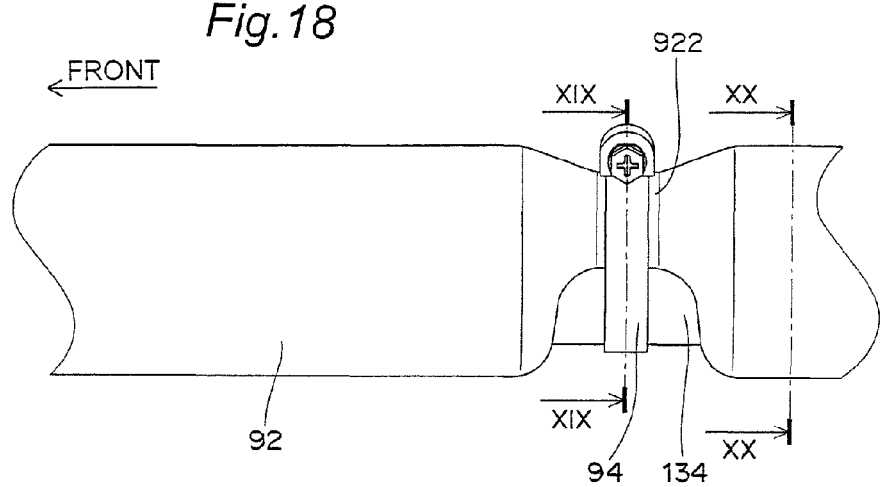
FIG. 18 is a diagram showing a state where the second exhaust pipe cover is mounted on a rear portion 134 of the exhaust pipe of the front-cylinder exhaust pipe 13.
Figure 19:
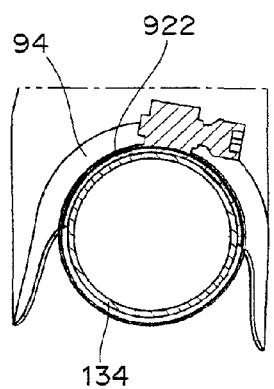
FIG. 19 is a sectional view taken along line XIX-XIX in FIG. 18.
Figure 20:
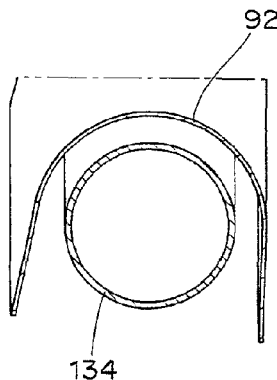
FIG. 20 is a sectional view taken along line XX-XX in FIG. 18.

The second exhaust pipe cover 92 includes narrow parts 921, 922 and 923 at three locations, i.e., a front part, an intermediate part and a rear part in the longitudinal direction of the vehicle. An inner diameter of each of the narrow parts is reduced. FIG. 18 shows a state where the second exhaust pipe cover 92 is mounted on the exhaust pipe rear portion 134 of the front-cylinder exhaust pipe 13. FIG. 19 is a sectional view taken along line XIX-XIX in FIG. 18. FIG. 20 is a sectional view taken along line XX-XX in FIG. 18. The second exhaust pipe cover 92 is fastened by a clamp member 94 which is a support member at the narrow parts 921, 922 and 923, and comes into contact with an outer peripheral surface of the exhaust pipe rear portion 134 and fixed. Therefore, as shown in FIG. 19, the outer peripheral surface of the exhaust pipe rear portion 134 and the inner peripheral surface of the second exhaust pipe cover 92 come into contact with each other at the narrow parts 921, 922 and 923, but a gap is formed between the outer peripheral surface of the exhaust pipe rear portion 134 and the inner peripheral surface of the second exhaust pipe cover 92 at locations other than the narrow parts 921, 922 and 923 as shown in FIG. 20.

[Rear-Cylinder Exhaust Pipe Cover]

As shown in FIGS. 2 and 3, the rear-cylinder exhaust pipe 15 includes a third exhaust pipe cover 95 covering an outer side in the lateral direction of a portion 151 located behind the engine 3.

Figure 21:
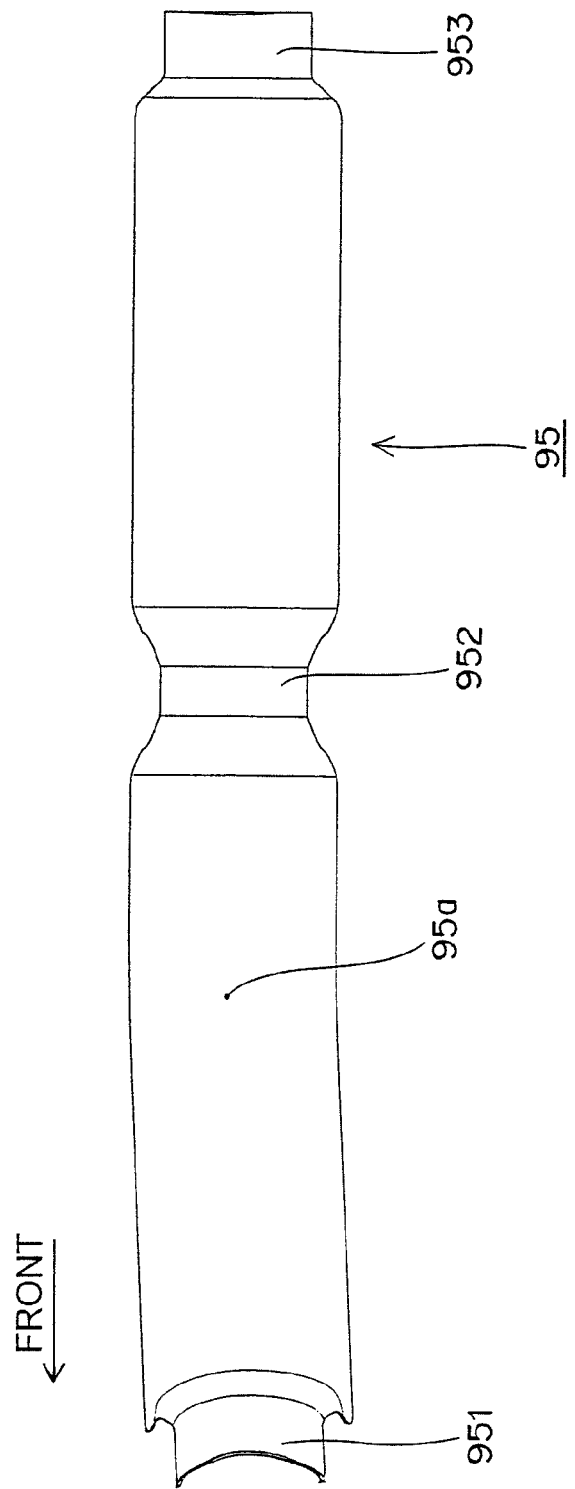
FIG. 21 is a side view of a third exhaust pipe cover.

FIG. 21 is a side view of the third exhaust pipe cover 95. As shown in FIG. 3, the rear-cylinder exhaust pipe 15 extends leftward and rearward from a back of the rear cylinder 11, and includes a bent part 15a at one location in the lateral direction. Therefore, the third exhaust pipe cover 95 includes a bent part 95a at a portion corresponding to the bent part 15a shown in FIG. 3.

Figure 22:
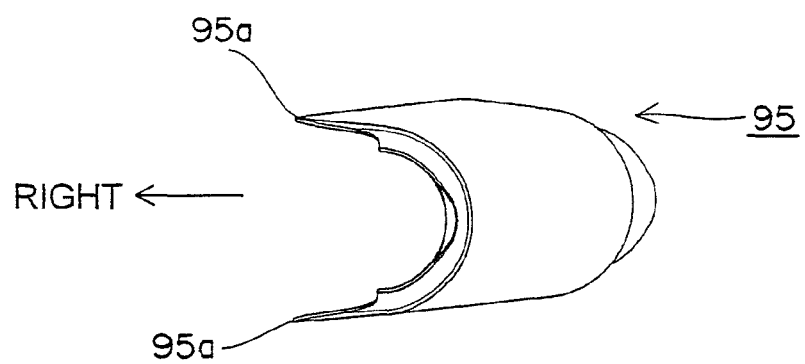
FIG. 22 is a front view of the third exhaust pipe cover 95 shown in FIG. 21.

FIG. 22 is a front view of the third exhaust pipe cover 95 shown in FIG. 21. As shown in FIG. 22, the third exhaust pipe cover 95 has a substantially U-shaped cross section, and the opening portion 95a is directed inward in the lateral direction. That is, the third exhaust pipe cover 95 covers an outer side (left side) of the rear-cylinder exhaust pipe 15 in the lateral direction.

As shown in FIG. 21, the third exhaust pipe cover 95 includes narrow parts 951, 952 and 953 at three locations, i.e., a front part, an intermediate part and a rear part in the longitudinal direction of the vehicle. An inner diameter of each of the narrow parts is reduced. A method of mounting the third exhaust pipe cover 95 on the rear-cylinder exhaust pipe 15 is the same as the above-described method of mounting the second exhaust pipe cover 92 on the exhaust pipe rear portion 134 of the front-cylinder exhaust pipe 13. That is, the third exhaust pipe cover 95 is fastened by a clamp member at the narrow parts 951, 952 and 953, comes into contact with an outer peripheral surface of the rear-cylinder exhaust pipe 15 and fixed. Therefore, the outer peripheral surface of the rear-cylinder exhaust pipe 15 and an inner peripheral surface of the third exhaust pipe cover 95 come into contact with each other at the narrow parts 951, 952 and 953, but a gap is formed between the outer peripheral surface of the rear-cylinder exhaust pipe 15 and the inner peripheral surface of the third exhaust pipe cover 95 at a location other than the narrow parts 951, 952 and 953.

[Muffler]

Figure 23:
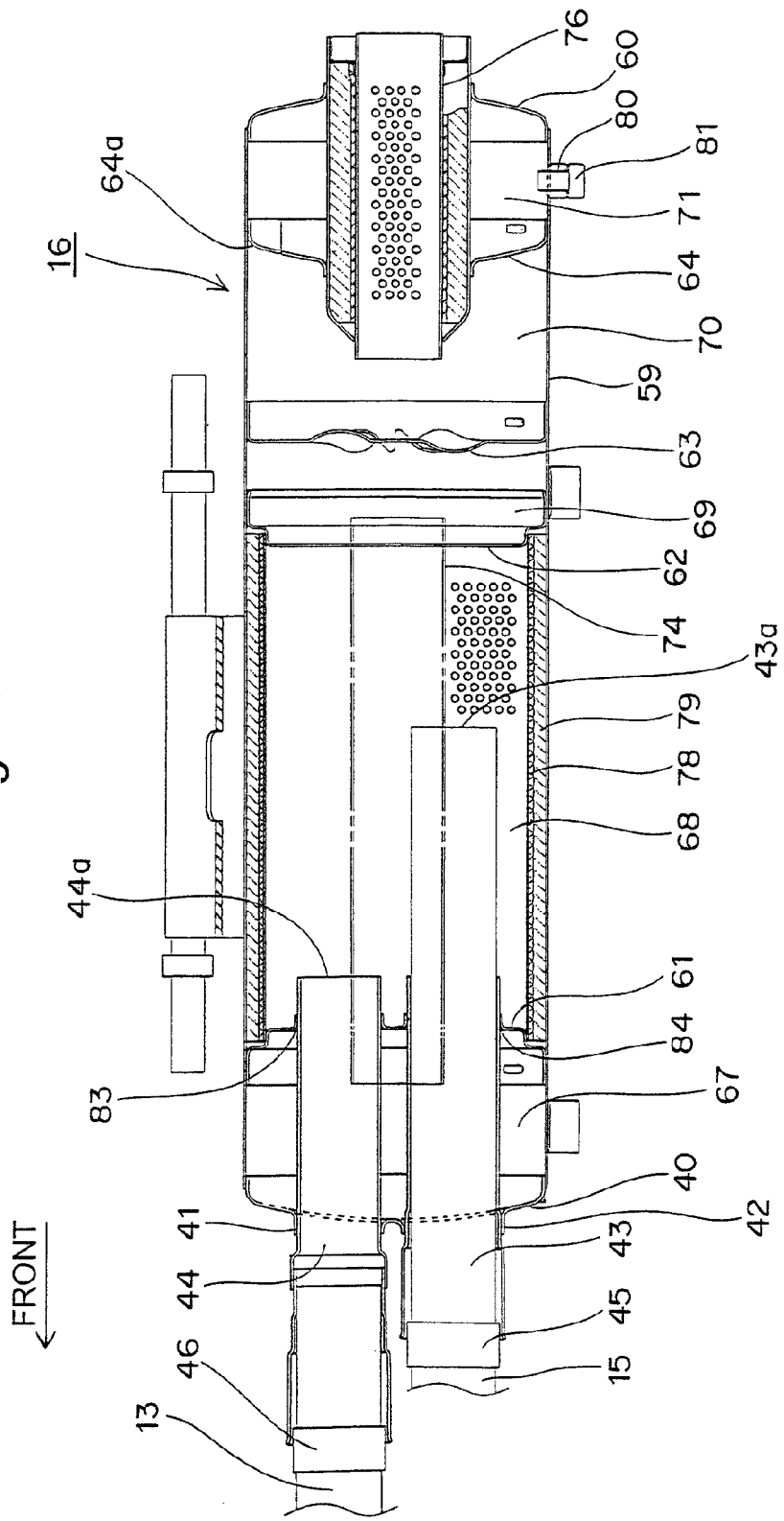
FIG. 23 is a vertical enlarged sectional view of the muffler.

FIG. 23 is a vertical enlarged sectional view of the muffler 16. The front wall 40 and the rear wall 60 are respectively fixed to front and rear ends of the outer cylinder 59 by welding the entire peripheries thereof. The inside of the outer cylinder 59 is divided by a plurality of partition plates 61, 62 and 64 and an arrester plate 63 into a resonance chamber 67, a first expansion chamber 68, a second expansion chamber 69, a carbon separation/third expansion chamber 70 and a carbon accommodation chamber 71 in this order from the front. A communication tube 74 for supplying exhaust gas to a central portion of the arrester plate 63 is provided in the partition plate 62 between the first expansion chamber 68 and the second expansion chamber 69, and a tail tube 76 penetrating the carbon accommodation chamber 71 is provided in the third expansion chamber 70 and outside the muffler. An inner cylinder 78 made of punched metal and a cushioning 79 such as SUS wool are provided on an inner peripheral surface of the first expansion chamber 68, and a notch 64a which brings the third expansion chamber 70 and the carbon accommodation chamber 71 into communication with each other is formed in an outer peripheral end of the partition plate 64 between the third expansion chamber 70 and the carbon accommodation chamber 71. An opening having a twisted guide blade is formed in the arrester plate 63, exhaust gas supplied from the communication tube 74 is supplied into the third expansion chamber 70 as spin flow, and carbon is sent from the notch 64a into the carbon accommodation chamber 71. A carbon discharge port 80 is formed in a lower end of the carbon accommodation chamber 71, and the port is closed with a detachable plug 81.

The partition plate 61 disposed on the most front side is utilized for supporting a pipe, and tube-holding holes 83 and 84 corresponding to exhaust pipe connection ports 41 and 42 of the front wall 40 are formed. The joint tube 44 fixed to the front-cylinder exhaust pipe connection port 41 of the front wall 40 by welding its entire periphery penetrates the upper holding hole 83 of the partition plate 61, and opens at the first expansion chamber 68. The joint tube 43 fixed to the rear-cylinder exhaust pipe connection port 42 of the front wall 40 by welding its entire periphery penetrates the lower holding hole 84 of the partition plate 61, and opens at the first expansion chamber 68. That is, the joint tube 44 and the joint tube 43 are supported at two locations by the front wall 40 and the partition plate 61. A tip end 44a of the joint tube 44 which opens into the first expansion chamber 68 is located at a front portion in the first expansion chamber 68 as compared with a tip end 43a of the joint tube 43 which opens into the first expansion chamber 68. Exhaust gas discharged from the tip end 44a and exhaust gas discharged from the tip end 43a are mixed with each other in the first expansion chamber 68.

According to the above embodiment, the following effects can be obtained.

(1) The curved portion 13a of the front-cylinder exhaust pipe 13 in which a distance between the curved portion 13a and the front cylinder 10 is short and which has relatively high temperature in the entire front-cylinder exhaust pipe 13 is located inward of the second front part pipe 24 in the lateral direction. Therefore, as compared with the conventional case where the curved portion of the front-cylinder exhaust pipe is located outward of the side frame in the lateral direction, it is possible to reduce the heat influence of the front-cylinder exhaust pipe 13 exerted on the cowl located outward of the second front part pipe 24 in the lateral direction.

(2) Since the curved portion 13a has a distance from the power steering motor 7, it is possible to reduce the heat influence of the front-cylinder exhaust pipe 13 exerted on the motor 7.

(3) Since the front-cylinder exhaust pipe 13 has a distance from the throttle bodies 10a, 11a of the engine 3, it is possible to reduce the heat influence of the front-cylinder exhaust pipe 13 exerted on the throttle bodies 10a, 11a.

(4) Since the temperature of the rear-cylinder exhaust pipe 15 behind the engine 3 is higher than the temperature of the front-cylinder exhaust pipe 13, it is possible to block the heat influence from the rear-cylinder exhaust pipe 15 exerted on the cowl located outward in the lateral direction by the front-cylinder exhaust pipe 13 by locating the rear-cylinder exhaust pipe 15 inward in the lateral direction with respect to the front-cylinder exhaust pipe 13.

(5) Since the temperature of the rear-cylinder exhaust pipe 15 behind the engine 3 is higher than the temperature of the front-cylinder exhaust pipe 13, it is possible to block the heat influence from the rear-cylinder exhaust pipe 15 exerted on the vehicle body located at an upward position by the front-cylinder exhaust pipe 13 by locating the rear-cylinder exhaust pipe 15 below the front-cylinder exhaust pipe 13.

(6) Since the curvature of the front-cylinder exhaust pipe 13 in front of the fastening band 46 is set greater than a curvature of the rear-cylinder exhaust pipe 15 in front of the fastening band 45, it is possible to easily achieve a configuration in which the front-cylinder exhaust pipe 13 and the rear-cylinder exhaust pipe 15 are arranged side by side in the vertical direction in front of the muffler 16 and the front-cylinder exhaust pipe 13 is located outward in the lateral direction with respect to the rear-cylinder exhaust pipe 15 behind the engine 3.

(7) Since the angle between the first opening 13a3 and the second opening 13a4 of the curved portion 13a is about 45°, it is possible to easily curve and fold back the front-cylinder exhaust pipe 13 rearward by mounting the curved portion 13a. Since the front-cylinder exhaust pipe 13 includes the curved portion 13a, the front-cylinder exhaust pipe 13 can be easily located inward of the second front part pipe 24 in the lateral direction, and can be located such that the front-cylinder exhaust pipe 13 has a distance from the throttle bodies 10a and 11a of the engine 3. The curved portion 13a is formed by bonding the half members 13a1 and 13a2 having the same shape to each other. Therefore, it is possible to enhance the manufacturability of the half members 13a1 and 13a2 and assembling performance of the curved portion 13a (bonding operation between the front-cylinder exhaust pipe 13 and the half members 13a1 and 13a2).

(8) Since the front-cylinder exhaust pipe 13 and the rear-cylinder exhaust pipe 15 are connected to the same muffler 16, it is possible to reduce the number of mufflers and to reduce the number of parts. The piping structure is simplified as compared with the piping structure utilizing a collecting tube, and the assembling operability can further be enhanced. By making an insertion length of the front-cylinder exhaust pipe 13 into the muffler 16 shorter than an insertion length of the rear-cylinder exhaust pipe 15 into the muffler 16, the entire length of the front-cylinder exhaust pipe 13 and the entire length of the rear-cylinder exhaust pipe 15 become substantially equal to each other. Therefore, exhaust interference between the front-cylinder exhaust pipe 13 and the rear-cylinder exhaust pipe 15 can be reduced, and the output of the engine 3 can be enhanced.

(9) Since the front-cylinder exhaust pipe 13 and the rear-cylinder exhaust pipe 15 are arranged side by side in the vertical direction in front of the muffler 16, the front-cylinder exhaust pipe 13 and the rear-cylinder exhaust pipe 15 do not protrude in the lateral direction, and the front-cylinder exhaust pipe 13 and the rear-cylinder exhaust pipe 15 can be disposed compactly.

(10) The entire periphery of the exhaust pipe front portion 133 having high temperature is covered by the first exhaust pipe cover 91. Therefore, the heat influence from the front-cylinder exhaust pipe 13 is reduced. The outer side of the exhaust pipe rear portion 134 having low temperature in the lateral direction is covered by the second exhaust pipe cover 92. Therefore, the amounts of the exhaust pipe covers 91 and 92 can be reduced.

(11) Since the first exhaust pipe cover 91 includes the pair of half members 91a1 and 91a2, it is possible to easily mount the first exhaust pipe cover 91 on the exhaust pipe front portion 133. Since the second exhaust pipe cover 92 has a substantially U-shaped cross section, it is possible to easily form the second exhaust pipe cover 92 which covers the outer side of the exhaust pipe rear portion 34 in the lateral direction.

(12) Since the first exhaust pipe cover 91 and the second exhaust pipe cover 92 have the gap between themselves and the front-cylinder exhaust pipe 13, the heat influence from the front-cylinder exhaust pipe 13 can be reduced, and the temperature rise of the first exhaust pipe cover 91 and the second exhaust pipe cover 92 can be suppressed. Since the first exhaust pipe cover 91 and the second exhaust pipe cover 92 are in contact with the outer peripheral surface of the front-cylinder exhaust pipe 13 and fixed by the clamp members 93 and 94 at the narrow parts 911, 912, 913, 921, 922 and 923 at three locations, i.e., the front part, the intermediate part and the rear part, the gap is secured between the portion other than the narrow parts and the front-cylinder exhaust pipe 13, and the first exhaust pipe cover 91 and the second exhaust pipe cover 92 are reliably supported by the front-cylinder exhaust pipe 13.

(13) Since the front-cylinder exhaust pipe 13 includes the bent part 13b at one location in the portion covered by the first exhaust pipe cover 91, the first exhaust pipe cover 91 has the bent part 91b corresponding to the bent part 13b and the bent part 91b is located along the bent part 13b, and the first exhaust pipe cover 91 is easily supported by the front-cylinder exhaust pipe 13.

(14) Since the front-cylinder exhaust pipe 13 includes the bent part 13c at one location in the portion covered by the second exhaust pipe cover 92, the second exhaust pipe cover 92 includes the bent part 92c corresponding to the bent part 13c, the bent part 92c is located along the bent part 13c, and the second exhaust pipe cover 92 is easily supported by the front-cylinder exhaust pipe 13.

(15) Since the third exhaust pipe cover 95 has the substantially U-shaped cross section, it is possible to easily form the third exhaust pipe cover 95 which covers the outer side of the rear-cylinder exhaust pipe 15 in the lateral direction.

(16) Since the third exhaust pipe cover 95 includes the gap between itself and the rear-cylinder exhaust pipe 15, the heat influence from the rear-cylinder exhaust pipe 15 can be reduced, and the temperature rise of the third exhaust pipe cover 95 can be suppressed. Since the third exhaust pipe cover 95 is in contact with the outer peripheral surface of the rear-cylinder exhaust pipe 15 and fixed by the clamp member at the narrow parts 951, 952 and 953 at three locations, i.e., the front part, the intermediate part and the rear part, the gap is secured between the portion other than the narrow parts and the rear-cylinder exhaust pipe 15, and the third exhaust pipe cover 95 is reliably supported by the rear-cylinder exhaust pipe 15.

(17) Since the rear-cylinder exhaust pipe 15 has the bent part 15*a* at one location in the portion covered by the third exhaust pipe cover 95, the third exhaust pipe cover 95 includes the bent part 95*a* corresponding to the bent part 15*a*, the bent part 95*a* is located along the bent part 15*a*, and the third exhaust pipe cover 95 is easily supported by the rear-cylinder exhaust pipe 15.

Other Embodiments of the Invention (1) The invention can also be applied to a two-cylinder engine other than the two-cylinder V-engine.

(2) The invention can also be applied to a vehicle other than the straddle-type all-terrain four-wheeled vehicle.

Since the present invention can provide the exhaust device having the front-cylinder exhaust pipe capable of reducing the heat influence on the cowl located outward of the side frame in the lateral direction, the invention has a high industrial utility value.

What is claimed is:

1. An exhaust device of a vehicle having a V-engine including a front cylinder and a rear cylinder, the exhaust device comprising:
    at least one muffler disposed in a rear part of the vehicle;
    a front-cylinder exhaust pipe which is connected at a connecting portion to a front surface of the front cylinder and which reaches the muffler; and
    a rear-cylinder exhaust pipe which is connected to a rear surface of the rear cylinder and which reaches the muffler, wherein:
    the front-cylinder exhaust pipe is curved rearward at a curved portion from the connecting portion between the front-cylinder exhaust pipe and the front cylinder inward of a side frame in a lateral direction,
    the front-cylinder exhaust pipe is located outward in the lateral direction with a fixed space from the engine, and the front-cylinder exhaust pipe extends toward a rear part of the vehicle substantially along the side frame as viewed from above,
    the rear-cylinder exhaust pipe is disposed inward in the lateral direction with respect to the front-cylinder exhaust pipe, behind the engine,
    the front-cylinder exhaust pipe and the rear-cylinder exhaust pipe are both connected to the muffler,
    a curvature of the front-cylinder exhaust pipe in front of a connecting portion of the front-cylinder exhaust pipe to the muffler is set greater than a curvature of the rear-cylinder exhaust pipe in front of a connecting portion of the rear-cylinder exhaust pipe to the muffler, and
    the connecting portion of the front-cylinder exhaust pipe to the muffler and the connecting portion of the rear-cylinder exhaust pipe to the muffler are arranged side by side in a vertical direction.

2. The exhaust device according to claim 1, wherein the curved portion of the front-cylinder exhaust pipe is located rearward with a fixed space from a power steering motor.

3. The exhaust device according to claim 1, wherein the front-cylinder exhaust pipe is located outward in the lateral direction with a fixed space from a throttle body of the engine.

4. The exhaust device according to claim 1, wherein, behind the engine, the rear-cylinder exhaust pipe is disposed below the front-cylinder exhaust pipe.

5. The exhaust device according to claim 1, wherein
    an insertion length of the front-cylinder exhaust pipe into the muffler is shorter than an insertion length of the rear-cylinder exhaust pipe into the muffler so that an entire length of the front-cylinder exhaust pipe and an entire length of the rear-cylinder exhaust pipe are substantially equal to each other.

6. A straddle-type four-wheeled vehicle includes the exhaust device according to claim 1.

* * * * *